(12) United States Patent
Benvenuti et al.

(10) Patent No.: US 7,643,407 B2
(45) Date of Patent: Jan. 5, 2010

(54) METHOD AND APPARATUS FOR DETERMINING PROTECTION TRANSMISSION UNIT ALLOCATION

(75) Inventors: Nicola Benvenuti, Kanata (CA); David Steele, Kanata (CA)

(73) Assignee: Nortel Networks Limited, St. Laurent, Quebec ( * ) Notice: Subject to any disclaimer, the term of this patent is extended or adjusted under 35 U.S.C. 154(b) by 620 days.

(21) Appl. No.: 10/767,833

(22) Filed: Jan. 29, 2004

(65) Prior Publication Data
US 2005/0198524 A1    Sep. 8, 2005

(51) Int. Cl.
*H04L 1/00*    (2006.01)
*H04L 12/26*   (2006.01)
*H04L 12/28*   (2006.01)

(52) U.S. Cl. .................. 370/217; 370/218; 370/219; 370/220; 370/227; 370/228

(58) Field of Classification Search .............. None
See application file for complete search history.

(56) References Cited

U.S. PATENT DOCUMENTS

| | | | |
|---|---|---|---|
| 5,412,652 A * | 5/1995 | Lu | 370/223 |
| 6,278,689 B1 * | 8/2001 | Afferton et al. | 370/223 |
| 6,331,905 B1 * | 12/2001 | Ellinas et al. | 398/2 |
| 6,535,481 B1 * | 3/2003 | Andersson et al. | 370/225 |
| 6,901,048 B1 * | 5/2005 | Wang et al. | 370/228 |
| 2002/0093954 A1 * | 7/2002 | Weil et al. | 370/389 |

OTHER PUBLICATIONS

*SONET Bidirectional Line-Switched Ring Equipment Issues List Report*, Bellcore Generic Requirements GR-1230-ILR, Issue 4A, Feb. 1999.

* cited by examiner

*Primary Examiner*—Ayaz R Sheikh
*Assistant Examiner*—Blanche Wong
(74) *Attorney, Agent, or Firm*—Anderson Gorecki & Manaras (57) ABSTRACT

Protection transmission unit allocation, such as STS# in a SONET/SDH network utilizing time slot interchange on the working path, may be determined by disseminating connection information, connection identification information, and a prioritization scheme, to nodes on the network and allowing them to deterministically allocate protection transmission units to connections on the protection cycle. Network elements forming physical or logical rings may thus ascertain the location on protection for a given connection without requiring protection unit allocation to be disseminated from a central controller. Since each node is starting with the same connection information and running the same priority determination, each will end up with the same result and will know where to place and find connections on protection. Aspects of the invention may be employed for example in a SONET/SDH based network, a mesh network, or other type of network with dedicated protection paths and transmission allocation on those protection paths.

13 Claims, 8 Drawing Sheets

METHOD AND APPARATUS FOR DETERMINING PROTECTION TRANSMISSION UNIT ALLOCATION

BACKGROUND

1. Field

This application relates to communication networks and, more particularly, to a method and apparatus for determining protection transmission unit allocation.

2. Description of the Related Art

Data communication networks may include various computers, servers, hubs, switches, nodes, routers, proxies, and other devices coupled to and configured to pass data to one another. These devices will be referred to herein as "network elements." Data is communicated through the data communication network by passing protocol data units, such as frames, packets, cells or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, and how protocol data units should be handled or routed through the network by the network elements.

Communication networks may be configured in multiple different topologies, such as ring-based topologies and mesh topologies. Ring-based topologies advantageously provide fast protection switching such that if a failure is experienced on a portion of the ring, traffic may be diverted the other way through the ring to minimize disruption on the network. One common ring-based topology which has been successfully deployed in North America and several other parts of the World is commonly referred to as Synchronous Optical NETwork (SONET) Bi-Directional Switched Ring (BLSR). Another similar standard that is used extensively in Europe and several other areas is commonly referred to as Synchronous Data Hierarchy (SDH) Multiplex Section Shared Protection Ring (MS-SPRing). Although one or more embodiments of the invention may be described herein in connection with a SONET network implementation, the invention is not limited in this manner and may be more broadly utilized in connection with any other type of ring-based or mesh-based networks.

Mesh topologies enable nodes on the mesh to communicate with multiple other nodes so that traffic is not required to be communicated to a specific node as it progresses through the network. To increase the speed at which traffic may be protection switched through a mesh network without requiring a new path to be found through the mesh network, it is possible to create virtual rings and reserve a portion of the bandwidth on those rings to carry protection traffic in the event of a failure. Logical restoration paths in a mesh-network are commonly referred to as p-cycles. P-cycle enable the network devices to perform fast link restoration protection without requiring notification of the source or destination nodes. Thus, in a mesh network, the working path will be carried over the mesh network, while the restoration path will be carried over the logical ring. Restoration of traffic from a failed arc, however, should not have an unplanned negative impact on traffic which normally uses the restoration path. Mesh networks may be based on the SONET physical layer or other physical layer protocol. Rings, p-cycles, and other loop-related protection arrangements will be referred to herein as protection cycles.

SONET/SDH divides the total capacity on a link up into time slots, referred to in the standards as Synchronous Telecommunication Signals (STS#s). Conventionally, traffic to be transported through a SONET/SDH network was placed on a particular STS# or group of contiguous STS#s when it entered the ring and was transported through the ring on the same time slot(s) on every span between every pair of network elements forming the SONET ring. Maintaining traffic on the same time slot on all spans in the ring provided an easy way to locate the traffic on the protection path in the even of a failure, but proved to be inefficient in that bandwidth may be stranded on particular spans and unable to be allocated to a particular flow if that same time slot weren't available all the way through the ring. Similarly, the requirement that STS#s be placed on contiguous time slots resulted in time slots not being allocated to a channel despite the fact that there was sufficient bandwidth, in the aggregate, to handle the channel on the ring. For example, if a channel needed 3 STS#s and there were two sets of 2 contiguous STS#s, the flow would not be able to be passed onto the ring despite the fact that there was sufficient capacity on the ring to handle the new channel.

To overcome these limitations, a proposal has been made to allow a given connection to be carried on different time slots on different spans on the SONET ring. This has been conventionally referred to as Time Slot Interchange, which is described for example in U.S. patent Ser. No. 10/144,842, entitled Method And Apparatus For Bandwidth Optimization In Network Ring Topology, filed May 15, 2002, the content of which is hereby incorporated herein by reference.

SONET/SDH-based ring topology networks and other ring-topology networks generally contain a working path and a protection path for each span on the ring. The ring, either physical or logical as in the case of a mesh network, allows traffic to be communicated between two nodes on the ring in either direction so that if there is a span or node failure on the ring the traffic may be routed around the failure by reversing the direction of the traffic on the ring. SONET/SDH optical network rings are typically either a two fiber ring or a four fiber ring. A two fiber ring uses two fibers between each span of the ring. Each fiber span carries both the working-traffic channel and the protection channel whereby on each fiber, only a maximum of half the channels are defined as working channels and the other half of the channels defined as protection channels. A four fiber ring uses four fibers for each span of the ring. Working and protection pairs are carried over different fibers. That is, two fibers, each transmitting in opposite directions, carry the working channels; two other fibers carry the protection channels. Conventionally, when traffic was protection switched from the working path to the protection path, the time slot allocation was maintained so that the network elements in the ring would know which transmission unit, e.g. which time slot, on the protection path the connection could be located.

When the assumption that traffic will use the same time slot throughout the ring is removed, it becomes necessary to communicate the protection transmission unit allocation to the nodes on the ring. For example, assume that a given node was handling a connection that was received on the working path on STS#1 and was transmitted on STS#2 on the working path. If the node fails, it is unclear whether this traffic should be carried on STS#1, STS#2, or on a completely different STS# on the protection path.

This becomes more complicated in mesh-topology networks in which multiple paths may be used to back up flows through a given node. For example, if two nodes A and B are connected by three links, it is possible to set the maximum bandwidth on each link to be 66% and reserve 33% on each link as back-up. In the event that one of the links fails, the 66% traffic from the failed link may be split and passed over the 33% backup capacity on each of the other two links to achieve total restoration over the links.

One attempt to address this problem was to use a centralized approach whereby a centralized controller would generate tables and disseminate these tables to the nodes on the ring so that, upon occurrence of a failure, the nodes would know where the traffic would be located. This approach is described in more detail in U.S. patent application Ser. No. 10/144,842, the content of which is hereby incorporated by reference. Unfortunately, every time a new connection was added or a connection was deleted, these maps needed to be changed. Additionally, the deployed base of SONET/SDH networks did not have a convenient centralized computing platform, which complicated deployment into existing networks. Finally, when multiple failure scenarios were to be taken into account, the number of maps required to be generated and maintained grew to be quite large. Accordingly, it would be advantageous to have another method for determining protection transmission unit allocation.

SUMMARY OF THE DISCLOSURE

As described in greater detail below, protection transmission unit allocation may be determined by disseminating connection information, connection identification information, and a prioritization scheme, to nodes on the network and allowing them to deterministically allocate protection transmission units to flows on the network. In this way, network elements forming physical or logical rings may ascertain the location on protection for a given flow without the communication of maps from a central controller. By enabling each network element to make an independent determination, it is possible for each network element to determine the location of traffic of particular interest without requiring communication of the location information from a central control module. By providing each network element with connection information for flows being handled by the ring and a priority mechanism, it is possible to allow each element to make a determination and, since each is starting with the same information and running the same priority determination, each will end up with the same result. Aspects of the invention may be employed for example in a SONET/SDH based network, a mesh network, or other type of network with dedicated protection paths and transmission allocation on those protection paths.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, protection transmission unit allocation may be determined by disseminating connection information, connection identification information, and a prioritization scheme, to nodes on the network and allowing them to deterministically allocate protection transmission units to connections on the network. In this way, network elements forming physical or logical rings may ascertain the location on protection for a given connection without requiring maps to be distributed by a central controller. By enabling each network element to make an independent determination, it is possible for each network element to determine the location of traffic of particular interest without requiring communication of the location information from a central control module. By providing each network element with connection information for flows being handled by the NE and a priority mechanism, it is possible to allow each element to make a determination and, since each is starting with the same information and running the same location determination, each will end up with the same result. Aspects of the invention may be employed for example in a SONET/SDH based network, a mesh network, or other type of network with dedicated protection paths and transmission allocations on those protection paths.

Figure 1:
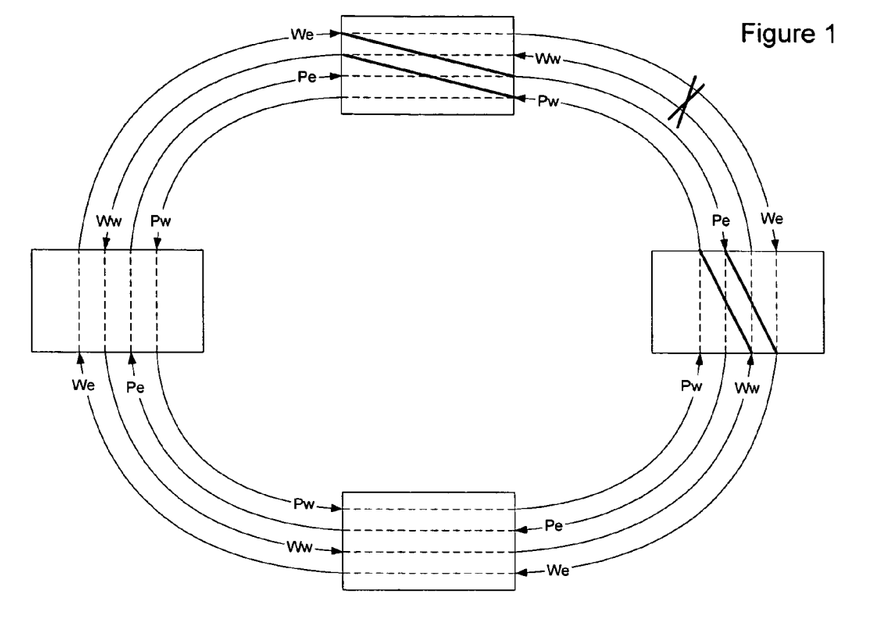
FIG. 1 is a functional block diagram of a ring-topology network illustrating span switching on the ring.

FIG. 1 illustrates one example of a four fiber ring network. In this example it will be assumed that SONET or SDH is being used as the underlying physical layer transport mechanism, although the invention is not limited in this manner. As shown in FIG. 1, a ring network generally includes a working east path (We) and a working west path (Ww). To enable traffic on the working paths to be protected in the event of a failure, the ring also includes a protection east path (Pe) and a protection west path (Pw). Network elements form nodes between spans on the ring-topology network. Traffic generally may enter the ring at any node and exit the ring at any node. Typically, the ring is part of a larger network having multiple interlocking rings.

FIG. 1 illustrates a span failure on the ring. As illustrated in FIG. 1, upon occurrence of a span failure, traffic from the working west path will be bridged to protection west, and traffic from working east will be bridged to protection east. Where time slot interchange is being used to improve traffic conditions and utilization on the ring, it is possible to use the same time slot assignment on the protection path so that dynamic allocation of time slots according to an embodiment of the invention is possible, but generally not necessary. Where there are multiple failures on the link, however, it may be necessary to implement dynamic time slot allocation as described in greater detail below.

Figure 2:
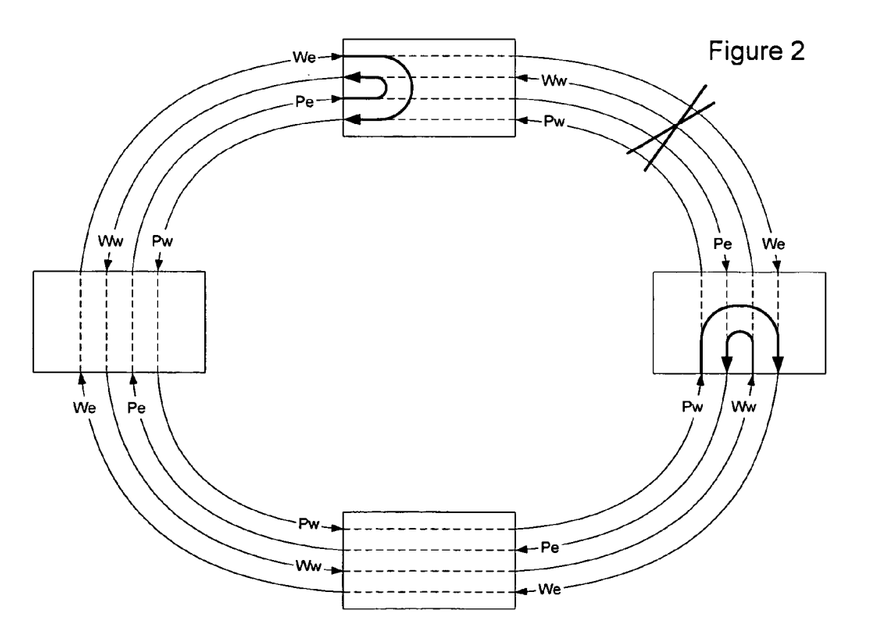
FIG. 2 is a functional block diagram of a ring-topology network illustrating ring switching on the ring due to a span failure.

FIG. 2 illustrates a link failure on the ring. In a link failure, both the working and protection paths are affected causing a ring switch in which traffic from the working west (Ww) path is placed onto protection east (Pe) and traffic from the working east (We) is placed onto protection west (Pw). In this instance, it is possible to assign time slots on the protection path to be the same as the assigned time slots on the working path, since only one time slot allocation is affected. The invention is not limited in this manner, however, as it may be desirable in certain instances to use this protection allocation procedures discussed in greater detail below. As before, however, where multiple failures occur in the network it may be necessary to dynamically allocate the time slots on the protection path in this circumstance as well.

Figure 3:
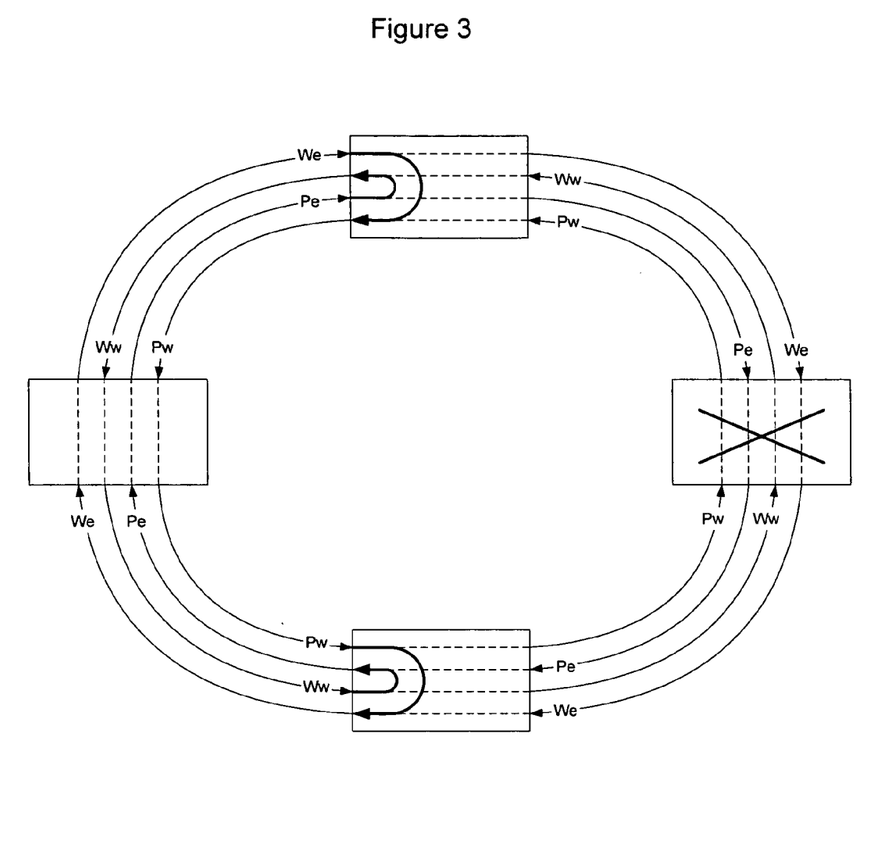
FIG. 3 is a functional block diagram of a ring-topology network illustrating ring switching on the ring due to a node failure.

FIG. 3 illustrates a node failure on the ring. A node failure affects traffic differently than a span or link failure. Specifically, assume that traffic on working east entering the failed node was on STS#1 and that same traffic on working east leaving the node was to be placed on STS#4. Since multiple time slots are involved, the other nodes will not know where to put the traffic on protection or where to receive the traffic on protection. According to one embodiment of the invention, as discussed in greater detail below, traffic on protection is placed according to the characteristics of the flows, as determined independently by each of the network elements on the ring.

Figure 4:
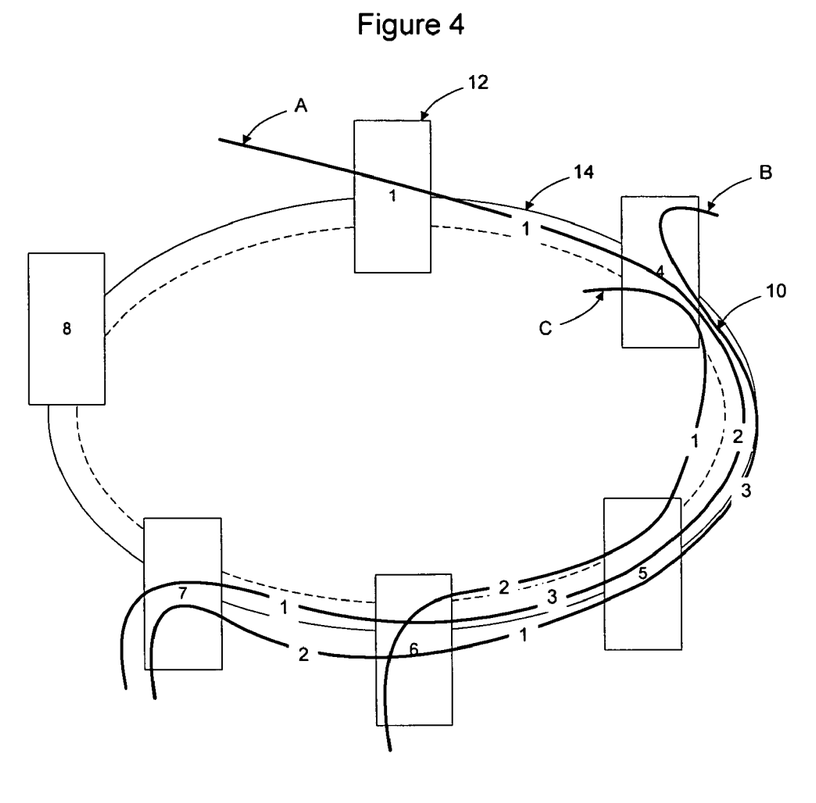
FIG. 4 is a functional block diagram of a ring-topology network illustrating several connections through the ring.

FIG. 4 illustrates an embodiment of the invention in which traffic flows 10 are configured to traverse network elements 12 interconnected by arcs 14 in a ring-topology network. As shown in FIG. 4, each flow 10 occupies a particular STS# on each arc, but the flow does not need to maintain the same STS# throughout the ring. Thus, flow A enters the ring at network element #1 and occupies STS#1 between network elements 1 and 4, STS#2 between network elements 4 and 5, STS#3 between network elements 5 and 6, and STS#1 between network elements 6 and 7. Flow B has a time slot interchange (TSI) order of STS#3, STS#1, STS#2 as it traverses through the arc from network element 4 to network element 7. Flow C has a TSI order of STS#1, STS#2, as it traverses the ring from network element 4 to network element 6.

Each of the flows on the ring has an AZ information associated with it, wherein A represents the location where the flow enters the ring and Z represents the location where the flow leaves the ring. Thus, in FIG. 4, the AZ information for the several illustrated flows may be represented as: AZ(flow A)=1, 4, 5, 6, 7; AZ(flow B)=4, 5, 6, 7; AZ(flow C)=4, 5, 6. Each flow typically will have a flow ID as well. For example, when a connection is provisioned on the network a unique ID may be added to the connection. The ID is given to each network element in the connection path. The global connection ID is a unique label for the connection. In one embodiment, the connection ID is a 64 character string that is stored by the network elements.

Figure 5:
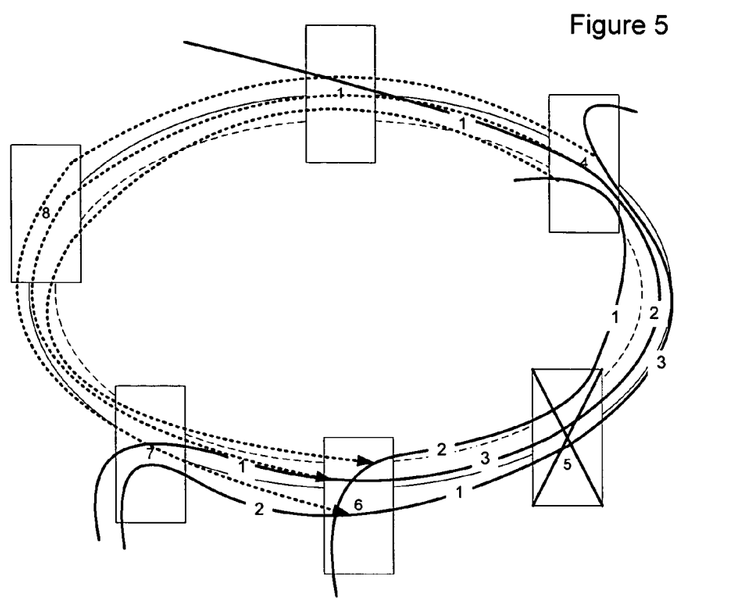
FIG. 5 is a functional block diagram of a ring-topology network illustrating Bi-directional Line Switched Ring (BLSR) switching on the ring due to a ring switch.
Figure 13:
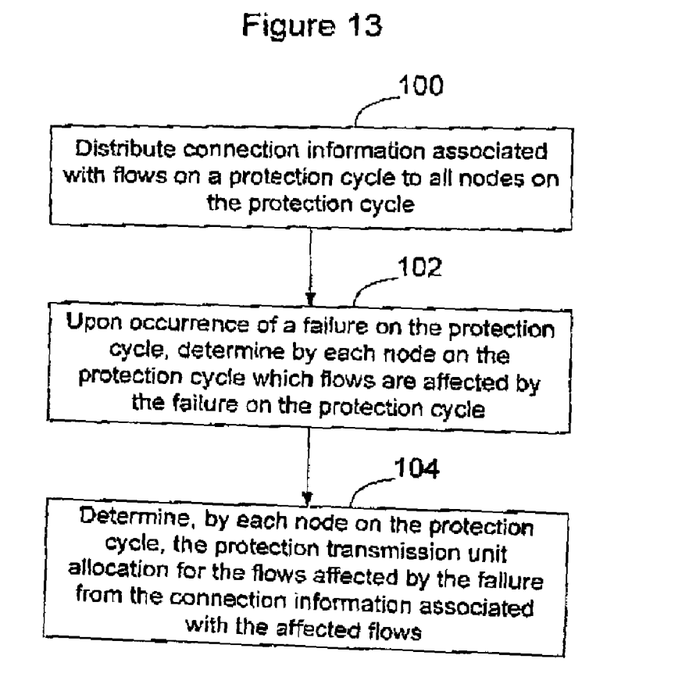
FIG. 13 is a flow diagram illustrating a method of determining protection transmission unit allocation on a protection cycle on a communication cycle according to an embodiment of the invention.

FIG. 5 illustrates the ring of FIG. 4, in which network element 5 has experienced failure and traffic is switched to protection. According to an embodiment of the invention, information associated with the flows through all nodes on the ring is distributed to all other nodes on the ring, e.g., when the flow is provisioned on the ring. (FIG. 13, block 100). Accordingly, each node on the ring is able to determine which flows are affected by the failure of the node (FIG. 13, block 102) and to calculate where on protection the various flows will be placed (FIG. 13, block 104).

There are several different ways to calculate which protection transmission units should be allocated to the flows affected by the network failure. For example, according to one embodiment of the invention, traffic may be assigned protection bandwidth transmission units according to their A/Z information, identification information, size, or other information used to characterize the flow on the network. The invention is not limited to this embodiment as other types of characterizing information may be used as well.

Figure 6:
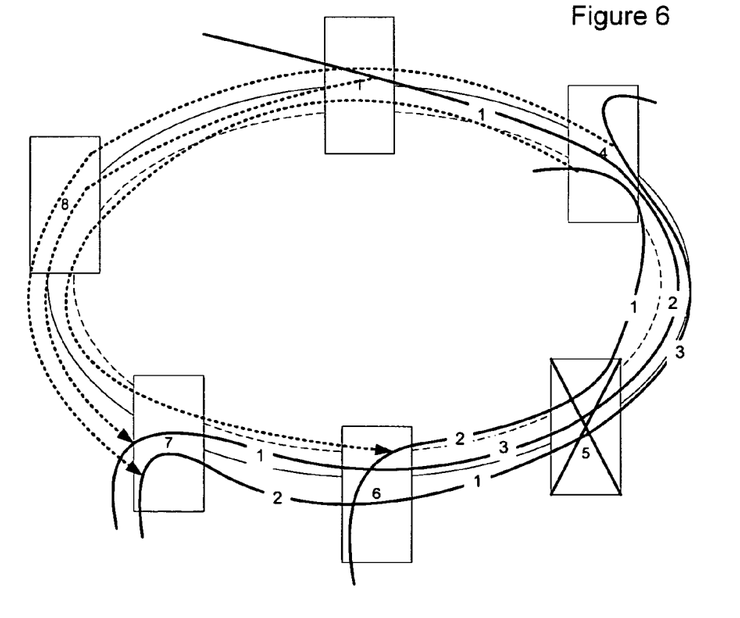
FIG. 6 is a functional block diagram of a ring-topology network illustrating Head End Ring Switching (HERS) on the ring due to a ring switch.

In the embodiment illustrated in FIG. 4, it will be assumed that node 5 experiences a failure. FIGS. 5 and 6 illustrate two possible ways of bridging the traffic onto protection. Specifically, FIG. 5 illustrates an embodiment in which Bi-directional Line Switched Ring (BLSR) is used to switch the traffic to protection, and FIG. 6 illustrates an embodiment in which Head End Ring Switching (HERS) is used to switch the traffic to protection. Both of these embodiments will be discussed in greater detail below. The invention is not limited to one of these particular examples, however, as other examples may also be used to illustrate the embodiment.

In the embodiment illustrated in FIG. 5, traffic at node 4 is bridged to protection as in normal Bi-directional Line Switched Ring (BLSR) mechanism in which traffic is switched to protection and taken off protection at the nodes nearest the failure. The protection bandwidth transmission units (STS#s in SONET/SDH) to be used to transport the flows affected by the failure in this embodiment are independently determined by the nodes adjacent the failure so that they are able to determine which flows should be allocated to which protection bandwidth transmission units. There are many ways to allocate the transmission units. While a preferred mechanism will be described herein, the invention is not limited to this particular mechanism but rather extends to other mechanisms that are employed by affected nodes in the protection cycle to determine independently the location of the flows on protection.

According to one embodiment of the invention, protection bandwidth transmission units may be assigned in the following order: (1) the Z node farthest away from the failure gets the lowest STS#; (2) if multiple connections to the same Z exist, the one with the farthest A node gets the lowest STS#; (3) if there is more than one flow with the same A and Z nodes, the one with the lowest ID# gets the lowest STS#. The invention is not limited to this particular example, as other methods of deterministically allocating protection transmission units such as STS#s may be used as well. Thus, while this particular example may be utilized advantageously to implement the invention, the invention more broadly extends to other methods of assigning STS#s.

In the example illustrated in FIG. 5, flows A, B, and C all traverse node 5. Thus, all three flows will need to be placed on protection. Flows that had an A or Z node equal to node 5 would not be placed onto protection as these flows are not restorable. In this example, flows A and B both have a Z node equal to node 7, while flow C has a Z node equal to node 6. Since node 7 is farther away from the failure than node 6, flows A and B will get lower STS#s than flow C. Since flow A has an A node (node 1) that is farther away than flow B's A node (node 4), flow A will get a lower STS# than flow B. Thus, in this example, STS#A would get the lowest STS#, flow B would get the second lowest STS# and flow C would get the next STS#. If two flows had the same AZ information, the one with the lowest ID would be allocated the lowest STS#. The invention is not limited to assigning STS#s in this manner as other allocation mechanisms may be used as well.

Thus, according to an embodiment of the invention, flow A/Z data or other information associated with the flows is used by the switching nodes to determine which connections pass through the failure and, for connections that pass through the failure, positions are identified on protection independently. Since both end nodes in the BLSR scheme make the determination independently, there is no need to communicate connection information to any of the other nodes. However, since each node makes an independent determination using the same information and using the same process, the nodes arrive at the same determination and are therefore able to determine the protection transmission unit allocation for the affected flows.

FIG. 5 illustrated an example in which a Bi-directional Line Switched Ring (BLSR) type process was used to put the network traffic on protection at nodes adjacent the failure. Specifically, as shown in FIG. 5, connection A entered the ring at node 1 and was passed to node 4. Due to the failure of node 5 on the ring, the connection A was switched to protection at node 4 and re-directed back through node 1 on protection. The invention is not limited to BLSR as other methods of putting traffic on protection may be used as well. For example, in the example illustrated below in connection with FIG. 6, Head-End Ring Switching (HERS) is used to switch traffic to protection as it enters the ring if it is destined to pass through a section of the ring that is failing. This avoids traffic being transmitted toward the fault and then retracing its path through the network but requires additional nodes on the ring to monitor the failures on the ring and determine the location on protection for flows affected by one or more failures on the ring.

FIG. 6 illustrates an embodiment of the invention in which Head End Ring Switching (HERS) is used to switch traffic to protection and take traffic off protection at its A and Z nodes. Specifically, as shown in FIG. 6, connections A, B, and C all pass through a failed node 5. Each node on the ring has been provided with A/Z information for all connections on the ring and thus knows which connections pass through the failure on the network. When there is a failure on the ring, the nodes independently determine where the traffic will be placed on protection. This may be done, as discussed above in connection with FIG. 5, by ascertaining the A/Z information and optionally ID information with the connections, and allocating available protection transmission units such as STS#s to the connections.

In HERS, traffic is placed onto protection and pulled from protection by the A/Z nodes, not the nodes adjacent the failure as was done above in connection with BLSR. Thus, in FIG. 6, connection A enters the ring at node 1. Since connection A passes through failed node 5, instead of being transmitted first to node 4 and then placed onto protection at node 4, it is placed directly onto protection by node 1. This doesn't alter the placement on protection, however, as the same STS# may be used to carry connection A regardless of where it is placed onto protection. Connections B and C both enter the ring at node 4. Thus, they will be placed directly onto protection by node 4.

Connections A and B both leave the ring at node 7. Accordingly, node 7 independently determines which connections are affected by the failure of node 5, determines where traffic connections will be placed on protection, and determines which connections are pass through connections and which are to be pulled off protection at node 7. Accordingly, node 7 will determine that connections A and B are to be pulled off protection, and will be able to determine where on protection these connections are being carried. In this manner, the connections can be pulled directly off protection by the drop nodes without requiring the traffic to be carried all the way around the ring and placed back onto the working path adjacent the failure, as was done with BLSR.

In the above-two examples, it has been assumed that the nodes will look to see whether the traffic is restorable. Specifically, for the three illustrated connections, the failure of node 5 did not affect the ability of the traffic to reach its destination since node 5 was not the drop node (Z node) for any of the connections. If one or more of the connections was to be dropped at node 5, the other nodes would determine that the traffic on that connection was not restorable and not allocate bandwidth on protection for that node.

Similarly, if there were multiple failures on the ring, e.g., if node 8 were to fail as well, the nodes would determine that the flows A, B, C, were not restorable due to a failure on the backup path as well. In this event the nodes would not allocate STS#s to these unrestorable flows. Accordingly, by causing the network elements to determine which flows are restorable based on the current state of the network elements forming the ring, it is possible to accommodate multiple failures on the ring simply and easily without requiring the development and dissemination of a large number of tables to the network elements. Rather, upon the occurrence of a failure, or a subsequent failure on the ring, the network elements determine the flows that are affected, determine which are able to be restored given the current state of failures, and allocate protection bandwidth transmission units to the restorable flows.

FIGS. 5 and 6 illustrated a few examples of how nodes may independently determine where the connections will be placed on protection. Other embodiments may include placing the connections on protection by placing the connection with the closest A node on the lowest STS#, placing the connection with the closest Z node on the highest STS#, or any other manner of selecting STS# allocation for flows based on their characteristics. Accordingly, the invention is not limited to the particular described embodiment.

Additionally, some connections may be of different sizes, for example connection A may require 12 STS# on protection whereas one of the other connections may only require 3 STS#s or 1 STS#. According to one embodiment of the invention, the process of allocating STS#s may be repeated for each connection class, determined for example according to the size or number of STS#s the connection will need on protection. For example, the process may first allocate STS#s to all of the largest connections, then proceed to handle all the medium sized connections, and then finally allocate STS#s to the smallest connections. In this manner, STS#s may be allocated on protection by grouping all the largest connections together on the low STS#s. The invention is not limited to this embodiment, however.

At times a portion of the bandwidth on protection may not be used. Additionally, especially where connections are placed onto protection using Head End Ring Switching, which adds and drops connections to protection at their A/Z nodes, a portion of the bandwidth may be fragmented on particular spans/arcs on the ring. According to one embodiment of the invention, STS# time slots on protection may be exchanged as the traffic passes around the ring to optimize the ability to transmit traffic on protection. Additionally, it is common to use the protection bandwidth to transmit extra traffic where the ring is not experiencing a failure. According to another embodiment of the invention, Time Slot Interchange (TSI) may be used to transmit this traffic on protection where there is sufficient bandwidth to transmit the traffic.

For example, in FIG. 6, assume that connections A, B, and C have been switched to protection at nodes 1 and 4 as discussed in greater detail above. Each node on the path can determine, based on the A/Z connection information for that flow, where the connection will be placed on protection. Additionally, each node on the path is able to determine where on the ring the traffic will be dropped. If the traffic is shifted down toward lower STS#s as the traffic is taken off protection, a rudimentary TSI may occur aggregating more STS#s to be used to transport extra traffic as traffic is taken off or added onto protection.

An example may help explain the manner in which this embodiment operates. Assume in FIG. 6 that connection A is an STS12 connection and that connections B and C are each STS3 connections. Thus, connection A will need to be allocated 12 STS#s between nodes 1 and 7, connection B will need to be allocated 3 STS#s between nodes 4 and 7, and connection C will need to be allocated 3 STS#s between nodes 4 and 6.

For the span between nodes 4 and 1, nodes 4 and 1 will each determine that the only connections affected by the failure of node 5 are connections B and C. Applying the deterministic mechanism described above, nodes 1 and 4 will determine that B has the farthest Z node and thus allocate the lowest STS#s to connection B. Accordingly, on the span between nodes 1 and 4, B will be allocated STS1-STS3, and C will be allocated STS4-STS6.

At node 1, connection A is added to protection. Nodes 1 and 8 will determine that connections A, B, and C are affected by the failure of node 5, and will apply the deterministic mechanism to determine where to place the connections on protection. In this example, connections A and B have the farthest Z node, and connection A has an A node that is farther from the failure than connection B, so connection A will be allocated the lowest group of STS#s. In this example, connection A would be allocated STS1-STS12 on the span from node 1 to node 8, connection B would be allocated STS13-STS15, and connection C would be allocated STS16-STS18.

The same process would be repeated by nodes 8 and 7 to determine where traffic should be placed on protection on the span running between them. Since no traffic is added or dropped at node 8, the allocation on the span between nodes 8 and 7 would be the same as the allocation between nodes 1 and 8.

At node 7, two connections are dropped and one is passed through. Accordingly, connections A and B will be dropped at node 7 and connection C will be passed through. Since connection C is the only connection affected by the outage that still exists on protection, nodes 6 and 7 will each independently determine that connection C should be allocated the lowest STS#s. Accordingly, connection C will be allocated STS1-STS3 on the span between node 7 and node 6.

The bandwidth on protection not used to transmit connections affected by network problems may be allocated to extra traffic on the network. By using time slot interchange, it is possible to group the protection traffic together to minimize the amount of stranded bandwidth on protection, and hence to maximize the amount of bandwidth that may be used to transmit extra traffic.

According to one embodiment of the invention, extra traffic on protection may utilize Time Slot Interchange (TSI) to allow protection traffic to be added and dropped as well as to optimize the amount of extra traffic that may be transmitted. In the example described above, assume that an additional STS#3 connection was configured to enter the ring at node 4 and be transmitted on protection from node 4 to node 6. In ordinary non-failure conditions, this connection would be allocated STS1-STS3, or any other STS#s. When a failure condition exists, the nodes affected by the failure will determine where traffic is to be placed on protection and will allocate bandwidth to the extra traffic last. Thus, in the example described above, connection D would be allocated STS7-STS9 on the span between nodes 1 and 4, STS19-21 pm the spans between nodes 1 and 8, and nodes 8 and 7, and would be allocated STS4-STS6 on the span between nodes 7 and 6. The invention is not limited to this embodiment as numerous other methods of allocating bandwidth may be used as well.

Where there are multiple simultaneous failures on the ring, the nodes handle these failures in substantially the same way. Initially, the nodes each use the connection information to determine which flows are restorable and which are not restorable. For those flows that are restorable, each node will allocate bandwidth on protection to the restorable connection. For example, assume in FIG. 6 that both nodes 5 and 6 were experiencing failure. Connection C would not be restorable as it's Z node is experiencing failure. In this instance the other nodes would not allocate bandwidth on protection to connection C and may continue to use that bandwidth to transport extra traffic.

In certain ring topologies, the ring may include a bridge between two nodes, such as a link between nodes 4 and 7. By adjusting the deterministic mechanism to specify whether the protection traffic will be passed over the bridge, or which direction on the ring the traffic will be passed, it is possible to accommodate multiple different network topologies as well. The invention is not limited therefore to the simplified example used herein to illustrate operation of an embodiment of the invention but rather extends to other manners of determining protection transmission unit allocations.

Figure 7:
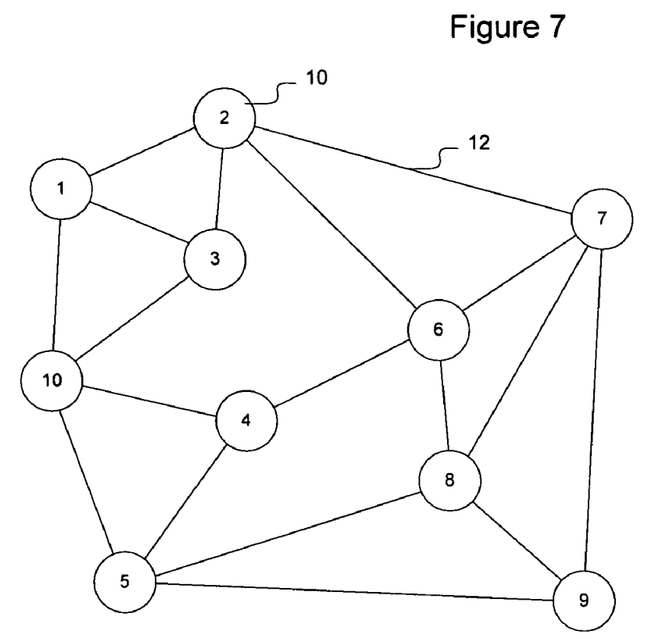
FIG. 7 is a functional block diagram of a mesh network.
Figure 8:
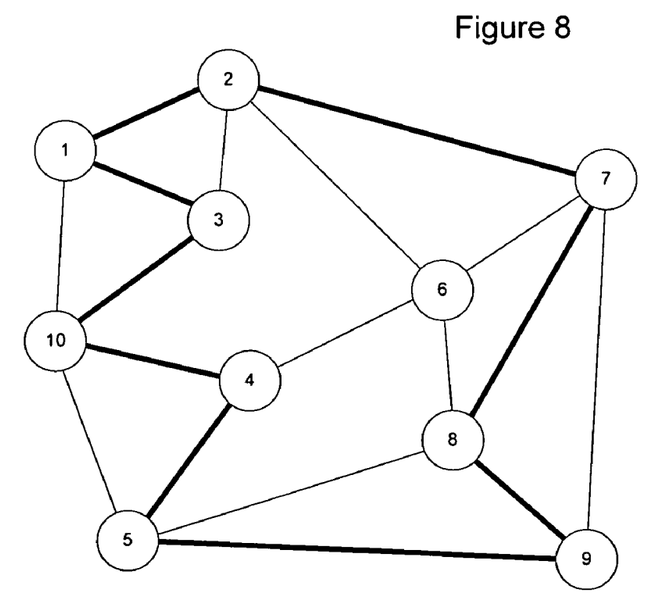
FIG. 8 is a functional block diagram of a mesh network illustrating a p-cycle on the mesh network.

In the previous description, an embodiment of the invention has been described in connection with ring-topology networks. The invention is not limited to ring networks, however, as other network topologies may be used as well. FIG. 7 illustrates one such network topology in which network nodes have been organized in a mesh. An embodiment of the invention as implemented in a mesh network will be discussed below in connection with FIGS. 7-9.

FIG. 7 illustrates an example mesh network including a set of nodes interconnected by arcs. Traffic may be routed through the mesh network in a number of conventional ways. Determining a path through the mesh network may take a not insignificant amount of time. To provide fast recovery from failure without requiring an entirely new path to be found through the network, it has become possible to designate protection ring-like structures on the mesh network. These protection paths in a mesh network are commonly referred to as p-cycles. Basically, a p-cycle is a pre-configured cycle formed out of spare capacity arcs. One example of a p-cycle is shown in bold lines in FIG. 8. In this example, the p-cycle is 1-2-7-8-9-5-4-10-3-1. This cycle has 9 arcs and 9 nodes on it. One advantage of designating p-cycles in a mesh network is that, upon failure, traffic affected by the failure may be quickly passed around the failure without requiring the traffic to be re-routed through the network.

Figure 9:
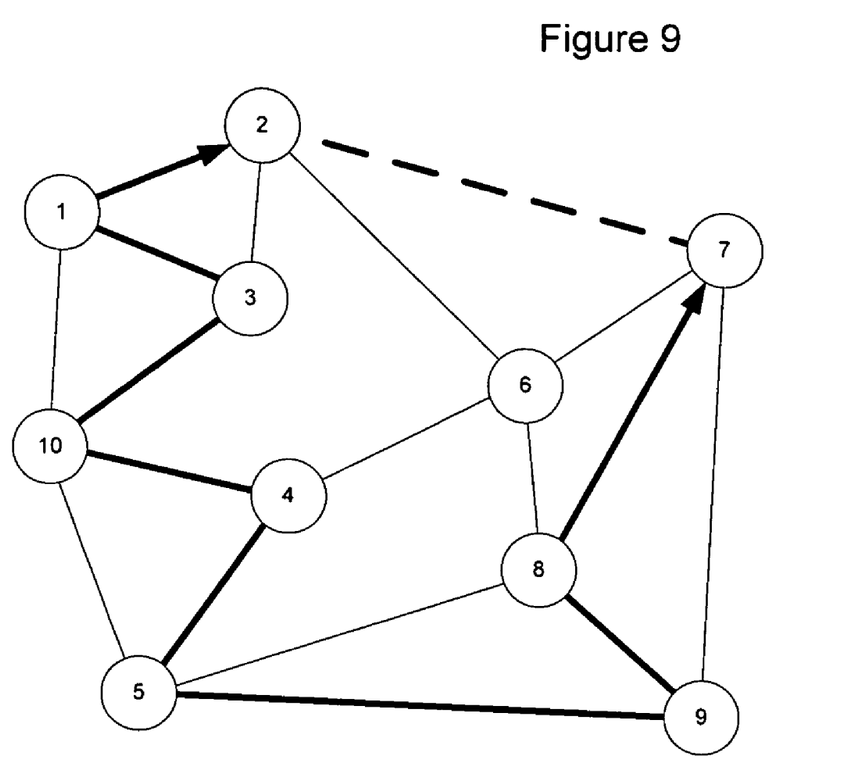
FIG. 9 is a functional block diagram of a mesh network illustrating a spanning arc failure in a mesh network.

FIG. 9 illustrates an example of a failure that may be restored using the illustrated p-cycle. FIG. 9 illustrates an example of a spanning arc failure. As shown in FIG. 9, if a spanning arc on the restoration cycle fails, it can be restored by a single path on the restoration cycle. In this example, assume that arc (7,2) fails. It can be restored through a single path given as: 7-8-9-5-4-10-3-1-2.

tection traffic (i.e., that B should occupy lower STS#s than connection A) and will transmit the connections A and B within the allocated protection bandwidth according in that order. Thus, assume for example that there is an optical fiber between each of the nodes, and that the underlying transport technology is based on SONET. The following table illustrates the working traffic STS# allocation, and the placement of connections A and B on protection for both BLSR and HERS (assuming both connections are of STS3 size):

| Span | Working | BLSR:A | BLSR:B | HERS:A | HERS:B |
|---|---|---|---|---|---|
| 1 → 3 | STS#1-23 | STS#27-29 | STS#24-26 | STS#24-26 | none |
| 3 → 10 | STS#1-12 | STS#13-15 | STS#13-15 | STS#13-15 | none |
| 10 → 4 | STS#1-32 | STS#36-38 | STS#33-35 | STS#36-38 | STS#33-35 |
| 4 → 5 | STS#1-4 | STS#8-10 | STS#5-7 | STS#8-10 | STS#5-7 |
| 5 → 9 | STS#1-18 | STS#22-24 | STS#19-21 | STS#22-24 | STS#19-21 |
| 9 → 8 | STS#1-18 | STS#22-24 | STS#19-21 | STS#22-24 | STS#19-21 |
| 8 → 7 | STS#1-3 | STS#7-9 | STS#4-6 | STS#7-9 | STS#4-6 |

Depending on the characteristics of the underlying network transport technology, it may be advantageous to provide the network elements forming the p-cycle with information about where the traffic will be placed on protection. According to an embodiment of the invention, A/Z and/or other connection information may be distributed to network elements on a p-cycle such that, when one of the connections on the network p-cycle is affected, the other nodes forming the p-cycle may determine where the connections may be found on protection. In this manner, connection information may be used by the network nodes to determine which traffic is considered protection traffic on the p-cycle and which traffic is working traffic, and differentiate flows within the portion of the bandwidth allocated to carrying protection traffic.

Figure 10:
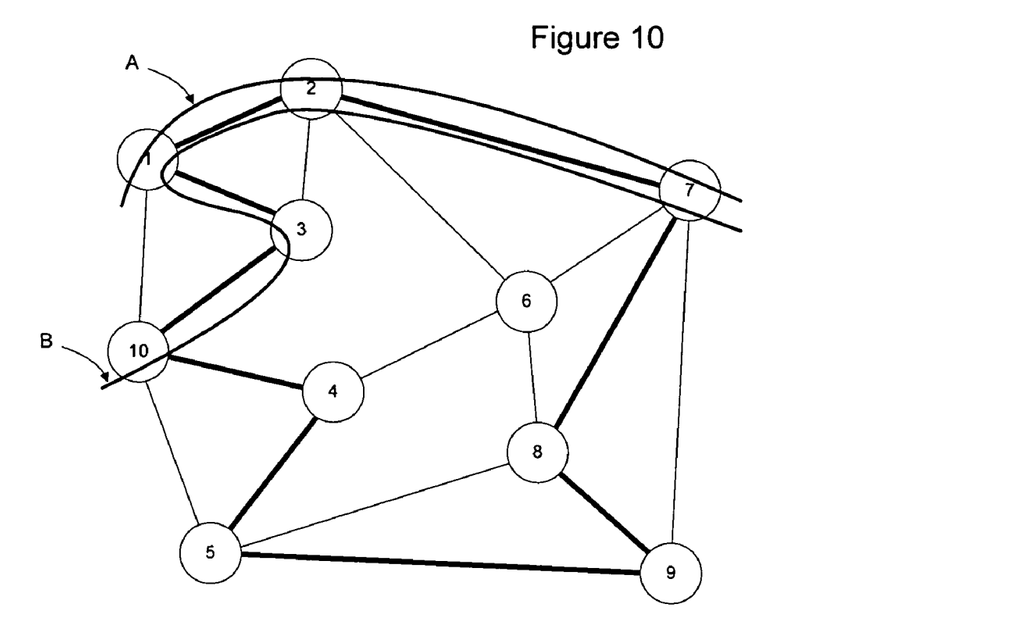
FIG. 10 illustrates BLSR-type recovery of flows on a p-cycle in a mesh network in response to a node or link failure according to an embodiment of the invention.
Figure 11:
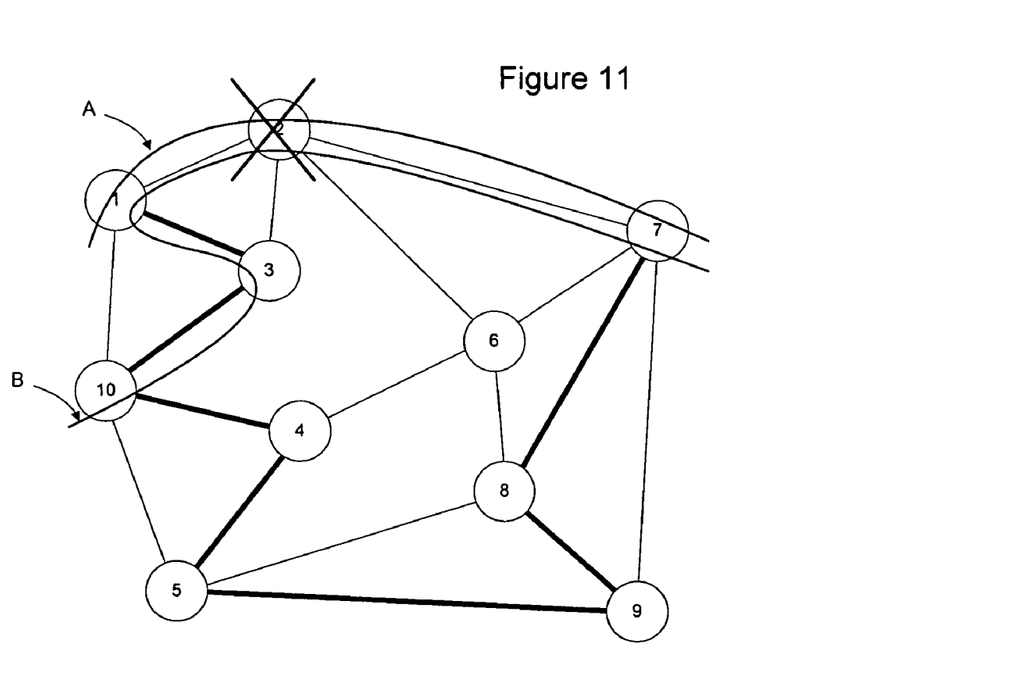
FIG. 11 illustrates HERS-type recovery of flows on a p-cycle in a mesh network in response to a node or link failure according to an embodiment of the invention.

Assume, for example, as shown in FIGS. 10-11, that network node 2 experienced a failure and that connections A and B, passing through node 2, needed to be transported on the protection bandwidth associated with the p-cycle. In the illustrated embodiment, the connection information for each node on a p-cycle is communicated to the other nodes on the p-cycle so that they may assess, at the time of failure, what connections are affected and determine where on protection they will be placed.

In this example, each of the nodes on the p-cycle would determine that connections A and B were affected by the failure of node B, determine that both of these connections were restorable since neither was to be dropped from the p-cycle at node 2, and thus determine where on protection these two connections should be placed. Since connection A and connection B both have a Z node at node 7 on the P cycle, the nodes would next look to see which connection had the farthest A node. In this instance, the A node for connection B is farther from node 2 on the P cycle (3 hops) since the A node for connection A is only one hop away from the failing node.

The amount of protection transmission capability on each of the links on the p-cycle may vary. Unlike the situation where there was a dedicated optical fiber or other network transmission capacity reserved to transmit protection traffic, in a mesh network only a fraction of the bandwidth on any given link may be reserved for protection. The nodes interfacing the arcs know the capacity of the working traffic and, hence, the available capacity for protection traffic. According to one embodiment of the invention, each of the nodes on the p-cycle will determine where the relative position of the pro- In this table, two examples have been illustrated, one where a BLSR-type mechanism is used to place traffic onto protection, and another where a HERS-type mechanism is used to place traffic on to protection. Traffic in the BLSR context would be placed onto protection on the p-cycle at the nearest node (node 1 in this example) while traffic in the HERS context would be placed onto protection where it enters the p-cycle. Thus, in this context, flow A would be placed onto protection at node 1 on the P-cycle and flow B would be placed onto protection at either node 1 or node 10 on the P-cycle. In the HERS-type restoration mechanism, traffic is placed onto protection on the p-cycle when it enters the p-cycle. Thus, in the HERS-type context, flow A would be placed onto protection at node 1 on the P-cycle and flow B would be placed onto protection at node 10 on the P-cycle. The invention is not limited to these several examples of how the invention may be extended to operate in a mesh-networking context as other implementations may be possible as well.

Figure 12:
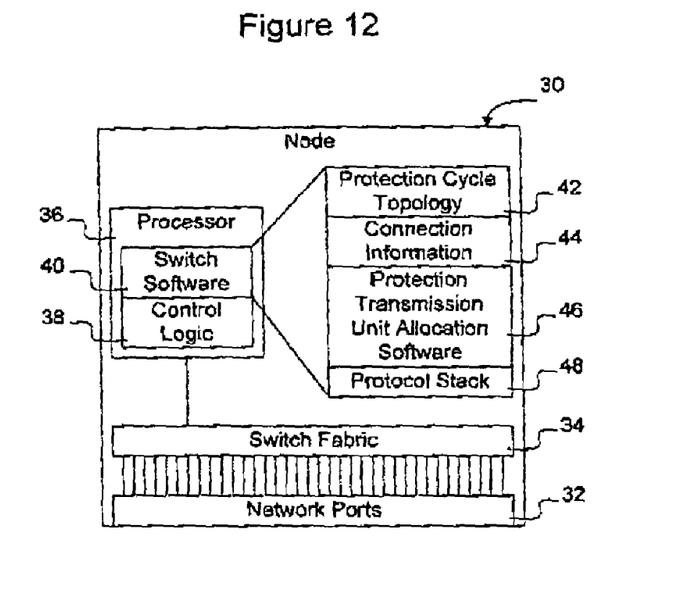
FIG. 12 is a functional block diagram of a network element configured to implement an embodiment of the invention.

FIG. 12 illustrates an embodiment of a network element that may be configured to function as a node in a SONET or mesh network. As shown in FIG. 12, a network element 12 includes network ports 32 configured to enable it to receive and transmit communications on a communications network. The node may also include other components, conventionally found in a node on a communication network, such as a switch fabric 34 and other conventional components. According to an embodiment of the invention, the node includes a processor 36 containing control logic 38 configured to implement embodiments of the invention. Specifically, as shown in FIG. 12, software 40 may be instantiated on control logic 38 to enable the processor to implement the functions ascribed to the node 12 discussed herein in connection with FIGS. 1-11.

The network element has a native or interfaced memory containing data and instructions to enable the processor to implement the functions ascribed to it herein, and contained in the switch software 40.

In the embodiment illustrated in FIG. 12, the switch software 40 includes a ring topology module 42 configured to collect information about protection cycles such as rings and p-cycles on the network in which the network element is participating. For example, in a ring-based network the network element would collect ring topology information in the protection cycle topology module/database. In a mesh network, information about p-cycles in which the node is participating may be contained in this module/database.

The network element may also include a connection information module 44 configured to collect information associated with connections provisioned through the protection cycles of interest to the network element. The connection information may include A/Z information, connection identification information, and any other information that may enable the node to make a protection transmission unit allocation determination according to an embodiment of the invention.

The network element may also include a protection transmission unit allocation software module 46 configured to use the information from the protection cycle topology module/database and the connection information module/database to determine which protection unit should be allocated to which connection when the connection is to be placed onto protection path on the protection cycle.

The network element may also include a protocol stack 48 to enable it to take action on the network and otherwise engage in protocol exchanges on the network. For example, in a SONET network the protocol stack may contain information associated with the SONET standard to enable the node to comply with the SONET standards and otherwise communicate on the SONET network. In a mesh network the protocol stack would contain data and instructions to enable the network device to comply with whatever standards are being used in the mesh network.

The control logic 38 may be implemented as a set of program instructions that are stored in a computer readable memory within the network element and executed on a microprocessor, such as processor 36. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of determining protection transmission unit timeslot allocations on a protection path for traffic flows on a working path upon occurrence of failure on the working path, the working path and protection path extending through a common set of nodes in a communication network and implementing a protection cycle on the communication network, the method comprising the steps of:
   distributing connection information associated with the traffic flows on the working path to all nodes on the protection path before occurrence of a failure on the working path; and
   upon occurrence of a failure on the working path, individually determining, by each node on the protection path, which traffic flows on the working path are affected by the failure on the working path and therefore will be carried on the protection path, and the timeslot allocations on the protection path of the affected traffic flows at that node based on the connection information associated with the affected traffic flows;
   wherein the traffic flows are carried in timeslots on the working path and the protection path, and wherein each individual traffic flow occupies one or more timeslot on the working path or on the protection path.

2. The method of claim 1, wherein the connection information comprises AZ information, where A represents the location where the flow enters the protection cycle and Z represents the location where the flow leaves the protection cycle.

3. The method of claim 2, wherein the connection information further comprises connection ID information.

4. The method of claim 1, wherein the protection cycle is a ring on the communication network.

5. The method of claim 4, wherein the step of determining the timeslot on the protection path is performed only after receipt of notice of the failure on the ring.

6. The method of claim 1, wherein the communication network is based on an optical transport technology which divides a total capacity of a link into time slots.

7. The method of claim 1, wherein the protection cycle is a ring, wherein the nodes are nodes on the ring, and wherein the connections are connections that are provisioned through at least two nodes on the ring.

8. The method of claim 1, wherein the communication network is at least one of a SONET and SDH based network, wherein the protection cycle is at least one of a SONET ring and an SDH ring, and wherein the timeslot allocation on the protection path is a time slot on the SONET ring or SDH ring.

9. The method of claim 1, wherein the protection cycle has two working paths and two protection paths, wherein time slot interchange is permitted on each of the working paths, and wherein time slots are allocated on each of the protection paths.

10. The method of claim 9, wherein extra traffic may be carried on each of the protection paths, and wherein time slot interchange is permitted for the extra traffic on each of the protection paths.

11. The method of claim 1, wherein the communication network is a mesh network, wherein the protection path of the protection cycle is a logical restoration path on the mesh network.

12. The node of claim 1, wherein the connection information further comprises connection size information associated with the connections.

13. A method comprising the steps of:
   distributing connection information associated with flows of working traffic being carried on a working path of a protection cycle in a communication network to all nodes on the protection cycle before occurrence of a failure on the working path, the protection cycle including the nodes, the working path passing through the nodes, and a protection path passing through the nodes;
   upon occurrence of a failure on the working path that would require at least some of the flows of working traffic to be carried on the protection path, individually determining, by each node on the protection cycle, which flows of working traffic are affected by the failure and thus will be carried on the protection path; and individually determining, by each node on the protection cycle, protection transmission unit allocations at that node for the flows of traffic being carried on the protection path, from the connection information associated with those flows.

* * * * *